Jan. 31, 1956  L. R. WHITTINGTON  2,732,986
METHOD AND APPARATUS FOR INFLATING HOLLOW
ARTICLES OF ELASTIC MATERIAL
Filed Sept. 9, 1954

INVENTOR.
LLOYD R. WHITTINGTON
BY
William Cleland
ATTORNEY

0
United States Patent Office 2,732,986
Patented Jan. 31, 1956

2,732,986

METHOD AND APPARATUS FOR INFLATING HOLLOW ARTICLES OF ELASTIC MATERIAL

Lloyd R. Whittington, Ashland, Ohio, assignor to The National Latex Products Co., Inc., Ashland, Ohio, a corporation of Ohio Application September 9, 1954, Serial No. 454,977

8 Claims. (Cl. 226—20)

This invention relates to hollow rubber-like articles, and in particular relates to a method and apparatus for inflating hollow balls made of elastic material.

Heretofore, hollow elastic balls, for example, have been inflated by various methods. Rubber balls inflated by conventional use of pills of volatile material during vulcanization thereof did not have uniform internal pressure, and hence there was a wide variance in the bouncing propensities of such balls. Balls inflated by insertion of an inflation needle through rubber slugs, valve stems, or the like on the inner wall surfaces of the balls caused the same to be off-balance and prevented smooth rolling and throwing action. Other methods of ball inflation required use of elaborate equipment or detracted from the outward appearance of the balls.

One object of the invention is to provide a method and apparatus for inflating hollow articles of elastic material, by which balls, for example, will have substantially uniform internal pressure and bouncing propensities.

Another object of the invention is to provide a method and apparatus for inflating hollow articles by which the same may have uniform wall thickness.

Another object of the invention is to provide an improved method and apparatus for inflating hollow elastic balls or like articles utilizing injection needle means, without forming substantially visible needle marks or other blemishes on the outer surface of the articles.

Another object of the invention is to provide a method of inflating hollow elastic articles, which does not require the use of cement for sealing an inflation needle aperture in the article wall.

Other objects of the invention will be manifest from the following brief description and the accompanying drawings.

Figure 1:
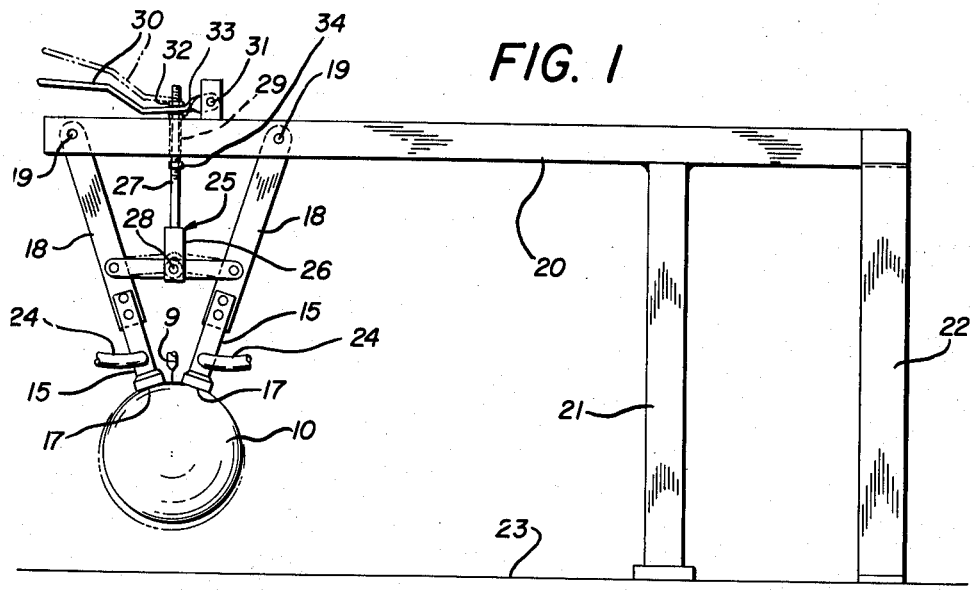
Figure 1 is a front elevation of a machine embodying the features of the invention and particularly adaptable for employing the method thereof.
Figure 3:
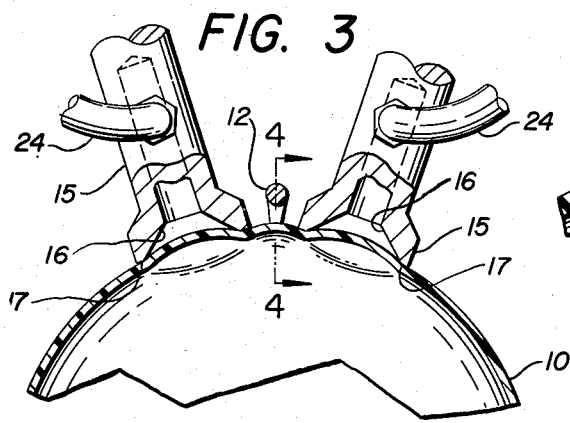
Figure 3 is a fragmentary front view, greatly enlarged and partly in section, of a portion of the ball-gripping means shown in Figure 1, but in a position for applying squeezing pressure to a ball gripped thereby.
Figure 4:
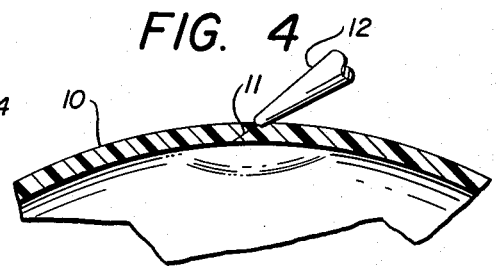
Figure 4 is a further enlarged fragmentary cross-section, taken substantially on the line 4—4 of Figure 3, but illustrating a step in the method, by which an air-injection aperture is sealed.
Figure 2:
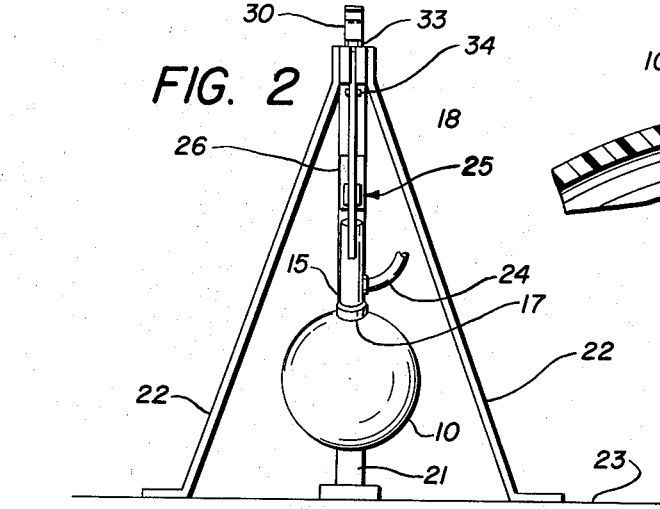
Figure 2 is an end elevation of the same as viewed from the left of Figure 1.
Figure 5:
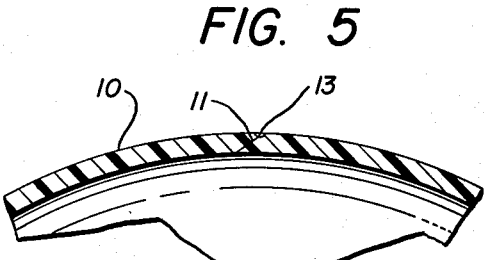
Figure 5 illustrates a view similar to Figure 4, showing the sealed air-injection aperture in a completed ball removed from the machine.

The improved method may include first the step of providing a hollow ball 10 of heat fusible elastic plastic material, such as any one of the various synthetic resin plastics, made by any of the various conventional processes to have a peripheral wall of uniform thickness (see drawings generally). Next, the ball is relatively fixedly held, as shown in Figures 1, 2 and 3, while an operator injects a hypodermic needle device 9, connected to a source of pressurized air, through the wall of the ball, preferably at an acute angle to a line tangent to the outer surface of the ball at the point of insertion of the needle (see Figures 4 and 5), thereby to inflate the ball to predetermined size, such as ten per cent larger than the formed size thereof (see full and chain-dotted lines in Figure 1). During or immediately after withdrawal of the inflation needle the ball is puckered or squeezed, as best illustrated in Figure 3, to compress the material thereof between spaced points at opposite sides of an aperture 11 made by said insertion of the needle, thereby to hold said aperture closed against escape of air from the ball for a sufficient length of time to permit the operator to perform a final step of applying a suitably pointed end of a heated tool 12 to the outer surface of the ball (see Figure 4), directly at the outlet end of said aperture, the heat of said tool being effective to fuse the plastic material sufficiently to form a skin-coating, indicated at 13 in Figure 5, a few thousandths of an inch thick. The coating 13 is, therefore, integral with the wall material and is completely effective as a closure adapted to seal against loss of air from the ball during subsequent normal use of the same.

Referring particularly to Figures 1, 2 and 3 of the drawings, there is illustrated a device for releasably holding or supporting a ball 10 during the steps of the method referred to above. The numerals 15, 15 designate a pair of suction nozzles, having suction cavities 16, 16 opening at free outer ends thereof and defining smooth peripheral rims 17, 17 engageable with correspondingly smooth outer surface portions of the ball. These nozzles 15 are attached to a pair of elongated arms 18, 18 which are pivoted at 19, 19 to a horizontally extending support or bar 20, mounted on suitable supporting legs 21 and 22, 22 to overhang a work table 23 with a ball 10 spaced substantially above the table. Suction is applied within the chambers 16 by conduits 24, 24, from a suitable suction applying pump (not shown), connected to the nozzle 15.

In a normal inoperative condition of the holding device a toggle mechanism 25 holds the arms 18 in converging relationship from the points of support 19 thereof, to have longitudinal axes of the respective nozzles 15 passing approximately through the center of the ball supported thereby, the rims 17 of the nozzles being arranged to expose a substantial area of the ball surface between opposing inner edges of said rims, as shown in Figure 1.

The toggle mechanism may include a toggle joint 26 connected between the arms 18, and a rod 27 pivoted to the knee 28 of the same and extending upwardly through a guide opening 29 in support 20. For manually operating the toggle mechanism, a hand lever 30, pivoted at 31 to the top of support 20, is somewhat loosely connected to the upper end of rod 27, between two nuts 32 and 33 threaded thereon, the lever being movable from the full line position to the chain-dotted position thereof shown in Figure 1, to move the nozzles 15 closer together, as shown in Figure 3, and thereby to squeeze and apply compressive force to the wall portion of the ball exposed between the nozzles. For purposes described, the nut 33, and a nut 34 on the part of the rod 27 below the support 20, serve as adjustable stop means engageable with said support to limit the movement of the arms 18 in opposite directions. Other means may be utilized to place all or part of the ball under compressive stress, including the wall portion through which needle 9 is injected as described.

In order to increase the coefficient of friction between the nozzles 15 and the smooth surface of ball 10, said nozzles may be made of metal, such as steel or brass, and the end portions, including particularly the rims 17, may be provided with a thin coating of skid-resisting material, such as polyvinyl chloride plastisol.

In operation of the ball-holding device, with the various parts thereof in the inoperative positions shown in full lines in Figure 1, an operator presses a ball 10 upwardly against the rims 17 of nozzles 15, whereby suction in the suction chambers 16 will grip the ball firmly. Now the operator injects an inflation needle device 9, connected to a suitable source of pressurized air, through the wall portion of the ball exposed between the nozzles to inflate the ball to predetermined size shown in chain-dotted lines in Figure 1.

Immediately after the ball is thus inflated the operator, upon withdrawing the needle device 9, lifts the lever 30 upwardly, thereby through the toggle joint to urge the arms 18 inwardly to pucker or squeeze said portion of the ball between the nozzles, whereby the aforementioned compressive force concentrated in the so puckered wall portion will hold the injection needle aperture 11 closed, while the operator applies the heated tool 12 to form the permanent seal 13 over said aperture. After this sealing operation the operator moves the lever 30 back to the full line position of Figure 1 and forcibly or otherwise removes the ball from the grip of the suction nozzles.

Thus, has been provided a simple method for inflating hollow balls or the like, and simple, efficient means for practicing the method.

Modifications of the invention may be resorted to without departing from the spirit thereof or the scope of the appended claims.

What is claimed is:

1. A method of inflating a hollow inflatable article of flexible elastic material, comprising the steps of injecting an inflation needle through the wall of the article long enough to inflate the same with an inflating medium to predetermined pressure, compressing at least the portion of the inflated article surrounding the aperture made by said needle, thereby to hold the inflating medium in the article, and attaching closure means to said wall portion at the entrance of said aperture while so compressed, thereby to seal the aperture against loss of said inflation medium.

2. A method of inflating a hollow inflatable article of flexible, thermoplastic, elastic material, comprising the steps of injecting an inflation needle through the wall of the article long enough to inflate the same with an inflating medium to predetermined pressure, compressing at least the portion of the inflated article surrounding the aperture made by said needle, thereby to hold the inflating medium in the article, and applying a heated tool to said wall portion at the entrance of said aperture to fuse an integral coat of the elastic material over the entrance of said aperture while said portion is so compressed, thereby to seal the same against loss of said inflation medium.

3. A method of inflating a hollow inflatable article of flexible elastic material, comprising the steps of injecting an inflation needle through the wall of the article long enough to inflate the same with an inflating medium to predetermined pressure, compressing at least the portion of the inflated article surrounding the aperture made by said needle, thereby to hold the inflating medium in the article, and forming an integral weld of said plastic material at said aperture while said portion is so compressed, thereby to seal the same against loss of said inflation medium.

4. Apparatus for inflating hollow inflatable articles of flexible elastic material, comprising a support, a plurality of elements shiftably mounted on said support and having gripping means thereon adapted to engage and support a said article, and means operable for compressing at least a portion of the wall of the article in which an inflation aperture has been provided and placing the article material under compression to hold said aperture closed against loss of the inflating medium.

5. Apparatus for sealing hollow inflatable articles of flexible elastic material after inflation with an inflation needle, comprising a relatively fixed support, a pair of elements shiftably mounted on said support and each having suction cups thereon adapted to engage the surface of the article in spaced relation, selectively operable means for applying suction within said cups releasably to adhere the same to said surface of a said article, and means for shifting said elements to move the same from one spaced apart position at opposite sides of an aperture made in the wall of the article by the inflation needle to a spaced but closer relationship of said suction cups, thereby to pucker the wall material against the inherent resiliency thereof and by placing the same under compression holding said aperture closed against loss of inflation medium pending a subsequent aperture sealing operation.

6. Apparatus for sealing hollow inflatable articles of flexible elastic material after inflation with an inflation needle, comprising a relatively fixed support, a pair of elements shiftably mounted on said support and each having suction cups thereon adapted to engage the surface of the article in spaced relation, selectively operable means for applying suction within said cups releasably to adhere the same to said surface of a said article, and means for shifting said elements to move the same from one spaced apart position at opposite sides of an aperture made in the wall of the article by the inflation needle to a spaced but closer relationship of said suction cups, thereby to pucker the wall material against the inherent resiliency thereof and by placing the same under compression holding said aperture closed against loss of inflation medium, and heat fusing means being provided for welding portions of the wall material into said aperture while the same is held closed.

7. Apparatus for inflating hollow inflatable articles of flexible elastic material, comprising a support, a plurality of elements shiftably mounted on said support and having gripping means thereon adapted to engage and support a said article, and means operable for compressing at least a portion of the wall of the article in which an inflation aperture has been provided and placing the article material under compression to hold said aperture closed against loss of the inflating medium, said elements being elongated arms pivoted at one end to said support and said gripping means including suction cups on the free ends of the arms, said means for compressing including a toggle mechanism having a toggle joint operatively connected between said arms.

8. Apparatus for inflating hollow inflatable articles of flexible elastic material, comprising a support, a plurality of elements shiftably mounted on said support and having gripping means thereon adapted to engage and support a said article, and means operable for compressing at least a portion of the wall of the article in which an inflation aperture has been provided and placing the article material under compression to hold said aperture closed against loss of the inflating medium, said gripping means comprising suction members having recessed outer faces defining smooth peripheral edges engageable in sealing relation with the surface of a said hollow article, and conduit means from said recesses to a source of suction to said recesses.

References Cited in the file of this patent
UNITED STATES PATENTS
2,649,234    Taunton _____ Aug. 18, 1953